(12) United States Patent
Kwon et al.

(10) Patent No.: US 9,317,935 B2
(45) Date of Patent: Apr. 19, 2016

(54) APPARATUS AND METHOD FOR TRANSMITTING HANDWRITTEN MESSAGE INCLUDING TIME INFORMATION

(75) Inventors: Mu-Sik Kwon, Seoul (KR); Sang-Wook Oh, Ansan-si (KR); Jung-Rim Kim, Suwon-si (KR); Do-Hyeon Kim, Suwon-si (KR); Seong-Taek Hwang, Pyeongtaek-si (KR)

(73) Assignee: Samsung Electronics Co., Ltd (KR)

( * ) Notice: Subject to any disclaimer, the term of this patent is extended or adjusted under 35 U.S.C. 154(b) by 450 days.

(21) Appl. No.: 12/903,556

(22) Filed: Oct. 13, 2010

(65) Prior Publication Data

US 2011/0086650 A1    Apr. 14, 2011

(30) Foreign Application Priority Data

Oct. 13, 2009  (KR) .................. 10-2009-0097200

(51) Int. Cl.
| | |
|---|---|
| H04W 4/00 | (2009.01) |
| G06T 9/20 | (2006.01) |
| G06F 3/0488 | (2013.01) |
| G06T 9/00 | (2006.01) |
| H04L 12/58 | (2006.01) |
| H04M 1/725 | (2006.01) |
| H04N 1/00 | (2006.01) |

(52) U.S. Cl.
CPC .............. *G06T 9/20* (2013.01); *G06F 3/04883* (2013.01); *G06T 9/00* (2013.01); *H04L 12/584* (2013.01); *H04L 51/08* (2013.01); *H04M 1/72547* (2013.01); *H04N 1/00307* (2013.01); *H04N 1/00312* (2013.01); *H04N 1/00392* (2013.01); *H04N 1/00411* (2013.01); *H04M 1/72552* (2013.01); *H04M 1/72555* (2013.01); *H04M 2250/22* (2013.01); *H04N 2201/0013* (2013.01); *H04N 2201/0046* (2013.01)

(58) Field of Classification Search
CPC ........... G06T 9/00; G06T 9/20; H04L 12/584; H04L 51/08; H04M 1/72547; H04M 1/72552; H04M 1/72555; H04M 2250/22; H04N 2201/0013; H04N 2201/0046; H04N 1/00307; H04N 1/00312; H04N 1/00392; H04N 1/00411
USPC ............ 455/466, 566; 382/260, 113; 345/175
See application file for complete search history.

(56) References Cited

U.S. PATENT DOCUMENTS

| | | | |
|---|---|---|---|
| 6,724,918 B1 * | 4/2004 | Yen et al. ................. | 382/113 |
| 2003/0195976 A1 * | 10/2003 | Shiigi ........................ | 709/230 |

(Continued)

FOREIGN PATENT DOCUMENTS

| | | |
|---|---|---|
| CA | 2 526 633 | 5/2007 |
| CN | 101352015 | 1/2009 |

(Continued)

*Primary Examiner* — Wayne Cai
(74) *Attorney, Agent, or Firm* — The Farrell Law Firm, P.C.

(57) ABSTRACT

A method for transmitting and receiving a handwritten message having time information includes generating one or more codes using handwritten message information which is sequentially input by a user, converting the handwritten message information and the one or more codes into one image and transmitting the converted image, confirming whether a received image includes the one or more codes, and if the received image includes the one or more codes, sequentially reproducing the contents of the handwritten message according to an input order of the contents of the handwritten message by analyzing the one or more codes.

24 Claims, 5 Drawing Sheets

(56) References Cited

U.S. PATENT DOCUMENTS

| | | | |
|---|---|---|---|
| 2006/0148527 A1* | 7/2006 | Blount | 455/566 |
| 2008/0147806 A1* | 6/2008 | Robbie et al. | 709/206 |
| 2008/0297489 A1* | 12/2008 | Funo et al. | 345/175 |
| 2009/0034862 A1* | 2/2009 | Brown et al. | 382/260 |
| 2012/0083295 A1 | 4/2012 | Abdelazim | |

FOREIGN PATENT DOCUMENTS

| | | |
|---|---|---|
| KR | 1020070066661 | 6/2007 |
| WO | WO 2004/056083 | 7/2004 |

* cited by examiner

| MARKER TYPE | EXAMPLE OF MARKER | EXAMPLE OF MARKER IMAGE PATTERN |
|---|---|---|
| START OF CODE | 0x83C1 | |
| START OF STROKE | 0xFF00 | |
| END OF CODE | 0xFFFF | |

APPARATUS AND METHOD FOR TRANSMITTING HANDWRITTEN MESSAGE INCLUDING TIME INFORMATION

PRIORITY

This application claims priority under 35 U.S.C. §119(a) to a Korean Patent Application filed in the Korean Intellectual Property Office on Oct. 13, 2009 and assigned Serial No. 10-2009-0097200, the entire disclosure of which is incorporated herein by reference.

BACKGROUND OF THE INVENTION

1. Field of the Invention

The present invention relates generally to transmission of an image including a handwritten message, and more particularly, to an apparatus and method for transmitting and receiving an image which can reproduce a handwritten message using sequential time information.

2. Description of the Related Art

With the development of wired or wireless communication techniques, hardware manufacturing techniques of central processing units, memory, power charging techniques, and the like, functions of a mobile terminal have been greatly enhanced. For example, conventional mobile terminals only used voice calls to transmit a message. However, a mobile terminal capable of transmitting and receiving a text message allows users to use a Short Message Service (SMS) to transmit a message in a situation where a voice call cannot be made or where a simple message is to be transmitted.

The SMS has been adapted to a Long Message Service (LMS) to include a long text message or a Multimedia Message Service (MMS) to include a multimedia file, such as an image or moving picture. Due to such development, various benefits have been provided to users. Especially, demand for the MMS has been on the rise because of improved expression compared with the SMS or LMS, which transmit only a text message. A description of a method for transmitting a desired message using the MMS will now be given.

FIG. 1 is diagram illustrating an example of transmitting information using a conventional MMS.

Referring to FIG. 1, a user may compose an MMS by inputting a desired text on a handwriting recognition area or attaching a desired image. In an MMS input screen shown in FIG. 1, the handwriting recognition area is comprised of three single recognition areas each recognizing one character at a time. A user may input character information using a user's finger or an input tool such as a stylus pen. A user may transmit an image by calling the image stored in a memory using an area 'Attach File' below a text input window.

However, images transmitted using a currently provided MMS are images which have been previously stored. If a user desires to transmit a handwritten message using an MMS, the handwritten message should be changed to an image file using an application and should be stored before transmission. Moreover, when the handwritten message is changed to an image file, the message is changed to one still picture image. Namely, the changed image file does not include sequential time information written by a user.

In other words, when a receiving side receives an image included in the MMS, only one still picture image is shown and a process of composing the handwritten message by a transmitting side cannot be sequentially reproduced. Thus, since the handwriting and the sequential time information of the transmitting side cannot be transmitted, a vivid feeling disappears for the user.

SUMMARY OF THE INVENTION

An aspect of the present invention is to address at least the above-mentioned problems and/or disadvantages and to provide at least the advantages described below. Accordingly, an aspect of the present invention provides an apparatus and method in which a transmitting side transmits an image including a handwritten message having sequential time information to a receiving side and the receiving side sequentially reproduces the handwritten message in a time order using the sequential time information of the received image.

In accordance with an aspect of exemplary embodiments of the present invention, a method for transmitting and receiving a handwritten message including time information includes generating one or more codes using handwritten message information which is sequentially input by a user, converting the handwritten message information and the one or more codes into one image and transmitting the converted image, confirming whether a received image includes the one or more codes, and if the received image includes the one or more codes, sequentially reproducing the contents of the handwritten message according to an input order of the contents of the handwritten message by analyzing the one or more codes.

In accordance with another aspect of exemplary embodiments of the present invention, an apparatus for transmitting and receiving a handwritten message including time information includes an input/output unit for receiving handwritten message information from a user and generating a received image, a control unit for generating one or more codes using the handwritten message information, converting the handwritten message information and the one or more codes into one image and transmitting the converted image, confirming whether the received image includes the one or more codes, and if the received image includes the one or more codes, sequentially reproducing the contents of the handwritten message according to an input order of the contents of the handwritten message by analyzing the one or more codes, and a radio communication unit for transmitting and receiving images.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

Figure 1:
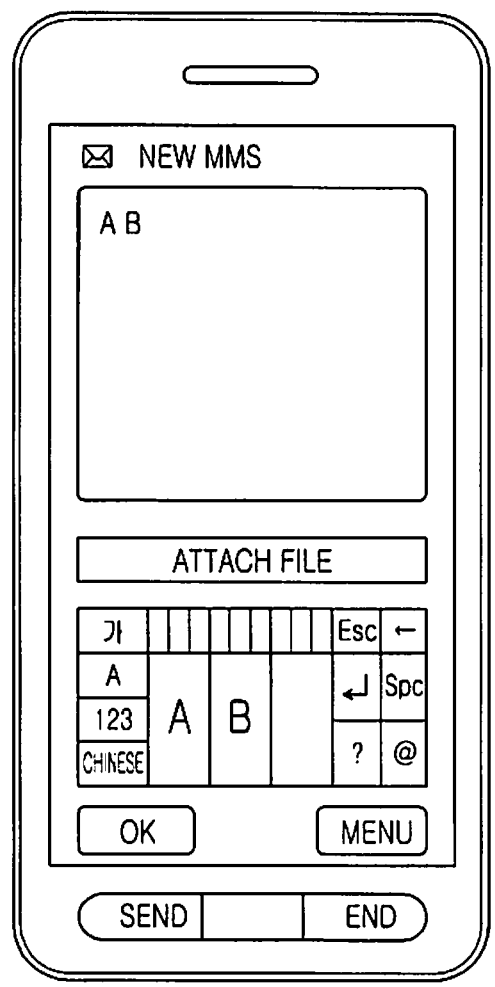
FIG. 1 is a diagram illustrating an example of transmitting information using a conventional MMS.
Figure 2:
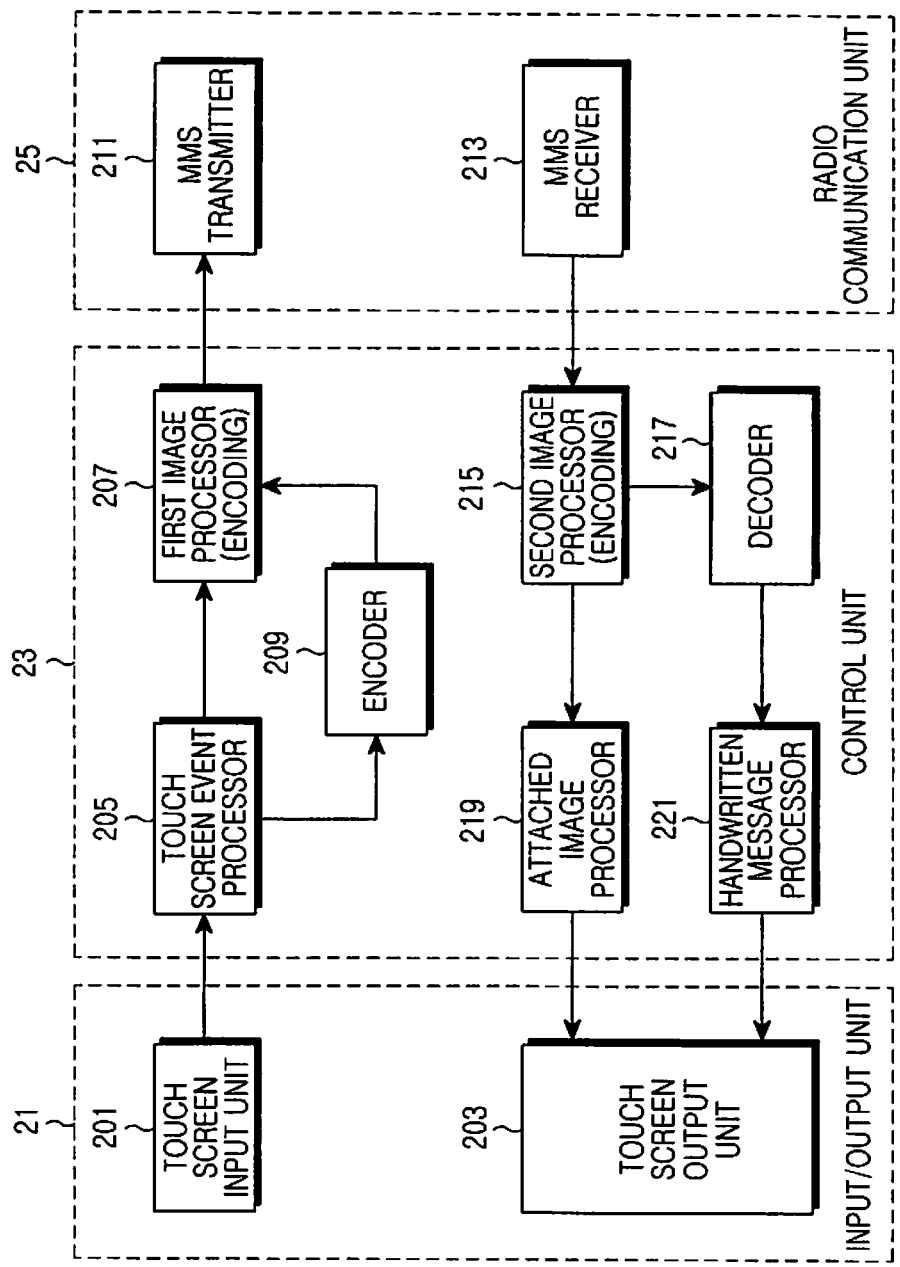
FIG. 2 is a block diagram illustrating an internal configuration of a mobile terminal for transmitting and receiving a handwritten message according to an embodiment of the present invention.

FIG. 2 is a block diagram illustrating an internal configuration of a mobile terminal for transmitting and receiving a handwritten message according to an embodiment of the present invention. The mobile terminal for transmitting and receiving a handwritten message including sequential time information includes an input/output unit 21, a control unit 23, and a radio communication unit 25. The input/output unit 21 is comprised of a touch screen input unit 201 and a touch screen output unit 203. The control unit 23 is comprised of a touch screen event processor 205, first and second image processors 207 and 215, an encoder 209, a decoder 217, an attached image processor 219, and a handwritten message processor 221. The radio communication unit 25 is comprised of an MMS transmitter 211 and an MMS receiver 213.

The touch screen input unit 201 of the input/output unit 21 receives handwritten message information input by a user and transmits the handwritten message information to the control unit 23. The touch screen output unit 203 of the input/output unit 21 generates an image received from the control unit 23. The handwritten message information includes sequential time information of handwriting by the user.

The control unit 23 interprets the handwritten message information received from the input/output unit 21, detects and encodes the time information and location information, and transmits the encoded time and location information to the radio communication unit 25. Moreover, the control unit 23 detects time information and location information included in an image received from the radio communication unit 25 and transmits the detected time and location information to the input/output unit 21.

In a preferred embodiment, the touch screen event processor 205 of the control unit 23 interprets the handwritten message information received from the input/output unit 21 according to preset events, transmits information about one or more interpreted events to the encoder 209, and transmits the handwritten message information to the first image processor 207. The encoder 209 encodes the information about one or more events interpreted by the touch screen event processor 205 and generates one or more codes. The encoding is performed by a lossless compression or non-compression scheme. The generated one or more codes are transmitted to the first image processor 207 and are used by a receiving side to reproduce a handwritten message according to sequential time information. The first image processor 207 converts the handwritten message information received from the touch screen event processor 205 and the one or more codes received from the encoder 209 into one image and compresses the image to Joint Photographic coding Experts Group (JPEG) format, and the like.

The second image processor 215 restores the image compressed to the JPEG format etc. so that one or more codes included in an image received from the radio communication unit 25 can be decoded and transmits the restored image to the decoder 217. If it is determined as a result of restoration of compression and interpretation of a received image that the image does not include any code, the second image processor 215 determines that the received image does not include a handwritten message and transmits the image to the attached image processor 219. Then the attached image processor 219 transmits the image to the touch screen output unit 203 so as to display the image on a screen. The decoder 217 decodes one or more codes included in the image to confirm time information and location information of each code. When codes included in the image are all decoded, the decoder 217 transmits the decoded information to the handwritten message processor 221. The handwritten message processor 221 sequentially reproduces a handwritten message using the decoded information received from the decoder 217. Since the decoded information includes the time information and location information, the handwritten message can be sequentially reproduced.

The radio communication unit 25 transmits and receives an image through the MMS transmitter 211 and the MMS receiver 213, respectively.

A process of generating an image including a handwritten message will now be described with reference to the above-described configuration of the mobile terminal.

Figure 3:
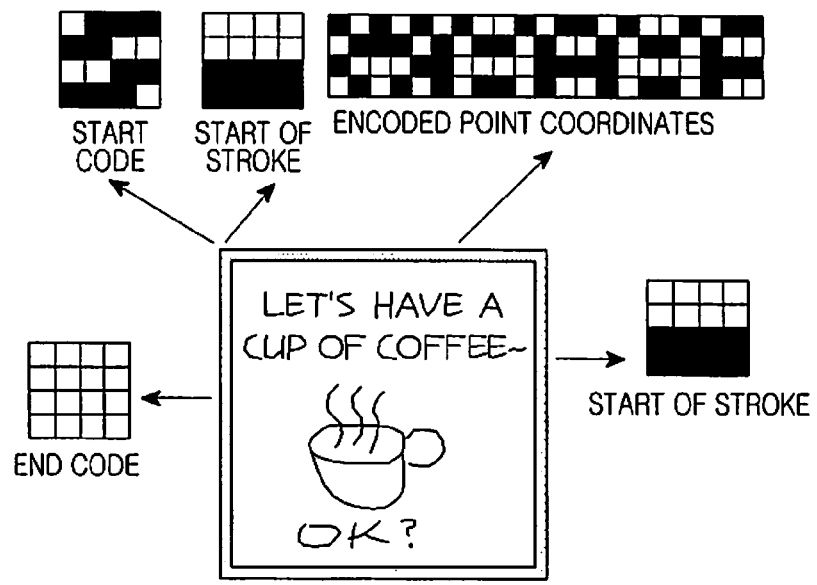
FIG. 3 is a diagram illustrating an example of an image including a handwritten message having sequential time information according to an embodiment of the present invention.

FIG. 3 is a diagram illustrating an example of an image including a handwritten message having sequential time information according to an embodiment of the present invention.

Referring to FIG. 3, a mobile terminal of a transmitting side interprets sequentially input handwritten message information according to events. In an embodiment of the present invention, the touch screen processor 205 divides events generated in relation to the input of the handwritten message information into three types, that is, touch-down, touch-move, and touch-up. The events may be further divided according to user settings. Assuming that a line comprised of connected points obtained by analyzing the handwritten message information is a stroke, the touch-down is generated as point coordinates the moment that a user starts an input, the touch-move is generated as a set of points on strokes from the start to the end of an input, and the touch-up is generated as a point the moment that a user finishes the input of one stroke.

When the first touch-down event is generated, the touch screen processor 205 transmits the event information to the encoder 209. The encoder 209 generates a code indicating the start of a handwritten message. Whenever a touch-down event is generated, the encoder 209 generates a code corresponding to the start of a stroke in order to inform that a new stroke is started. Starting with the start point of a stroke, a set of points is sequentially input to the encoder 209 by the generation of a touch-move event. The encoder 209 sequentially encodes coordinate values of the points and the encoded values are recorded in an edge of an image screen displayed on the touch screen output unit 203 as codes.

A touch-up event is generated to end one stroke. If a user has completed the composition of the handwritten message or an edge of a displayed image screen is filled with a permissible amount of codes, the encoder 209 generates a code indicating the end of the handwritten message.

Although not shown in the drawings, a part of an edge of a displayed image screen may not be fully filled with codes even if a user has completed the composition of the handwritten message. In this case, random codes may be inserted into the part of the edge to have an aesthetic effect.

Figure 4:
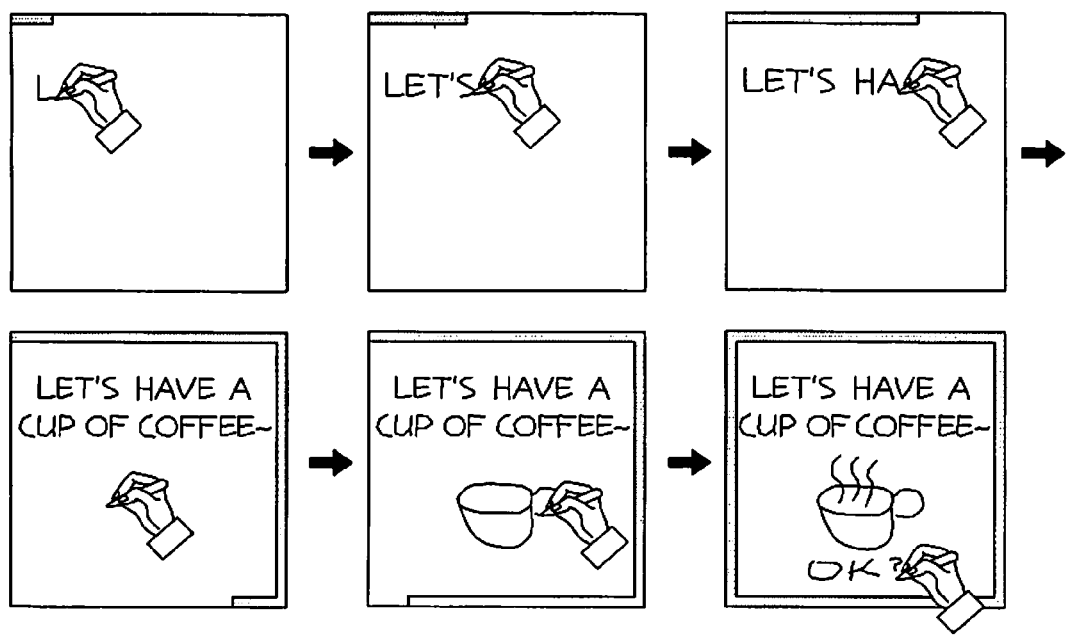
FIG. 4 is a diagram illustrating an example of composing a handwritten message by sequential time information according to an embodiment of the present invention.

FIG. 4 is a diagram illustrating an example of composing a handwritten message by sequential time information according to an embodiment of the present invention.

Referring to FIG. 4, every point has a unique coordinate value. The encoder 209 of the control unit 203 generates codes by performing encoding each time a point or a set of points within one stroke is generated. The touch screen output unit 203 displays the generated codes in real time. For example, when a user writes information such as "Let's have a cup of coffee" as indicated in FIG. 4, different codes are generated according to event types of points constituting each stroke and to coordinate values of the points. The generated codes are sequentially displayed on an edge of a displayed image screen at the same time when strokes are displayed on the screen.

When no handwritten message is composed or codes displayed on the edge of a displayed image screen reaches a maximum permissible amount, the encoder 209 generates a code indicating the end of the handwritten message and the touch screen output unit 203 displays the generated code on the touch screen output unit 203. Although FIGS. 3 and 4 show codes input along the edge of an image screen in a clockwise direction from the left upper side of an image, a code input direction may vary according to user settings.

Figures 5, 6:
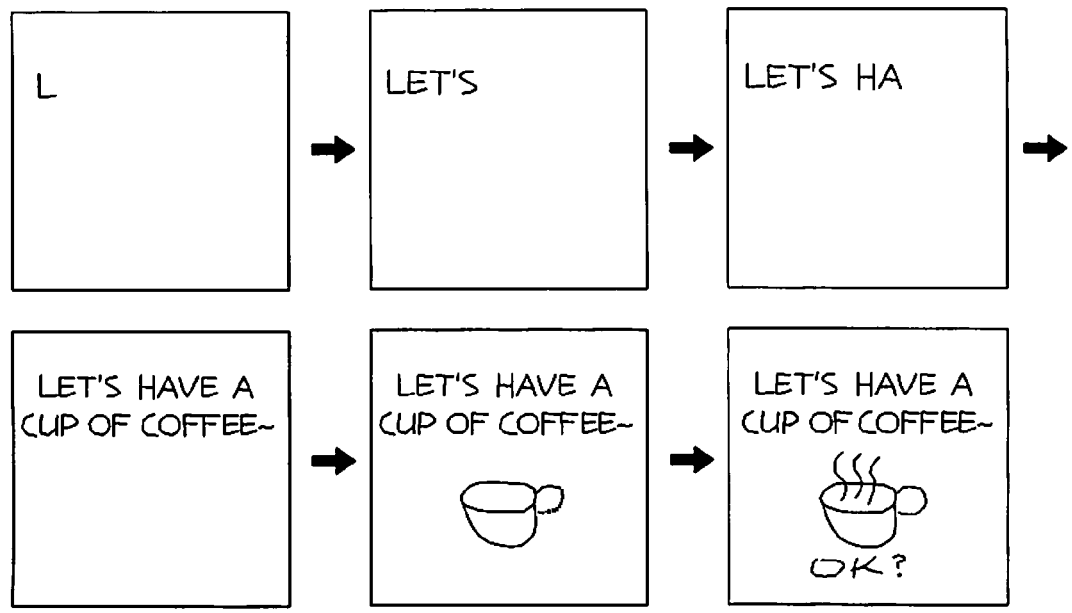
FIG. 5 is a diagram illustrating examples of markers corresponding to codes of events according to an embodiment of the present invention.
FIG. 6 is a diagram illustrating a process for reproducing a handwritten message including sequential time information according to an embodiment of the present invention.

FIG. 5 is a diagram illustrating examples of markers corresponding to codes of events according to an embodiment of the present invention. While, in FIG. 5, markers only corresponding to codes indicating the start of a handwritten message, the start of a stroke, and the end of the handwritten message are illustrated, many types of markers may be generated according to coordinates, event types, and/or attributes (e.g. color and thickness) of a writing line.

A process for reproducing a handwritten message including sequential time information will now be described with reference to the configuration of the mobile terminal.

FIG. 6 is a diagram illustrating a process for reproducing a handwritten message including sequential time information according to an embodiment of the present invention.

Referring to FIG. 6, the decoder 217 of the control unit 23 performs decoding in a clockwise direction, starting with a code indicating the start of a handwritten message, and reproduces the handwritten message in real time on the touch screen output unit 203. For example, when a handwritten message such as "Let's have a cup of coffee" is received, the decoder 217 decodes one or more codes generated according to an event type of points constituting each stroke and to coordinate values of the points. Then strokes are sequentially reproduced on the touch screen output unit 203. One or more codes, which have been displayed on an edge of an image screen, provide time information and location information during a decoding process. In this case, the time information and location information are not displayed on the touch screen output unit 203. If the mobile terminal cannot perform the decoding process because it is not equipped with the decoder 217, and the handwritten message according to sequential time information cannot be reproduced, codes on the edge of the image screen are displayed together with the handwritten message on the touch screen output unit 203 as one image.

Figure 7:
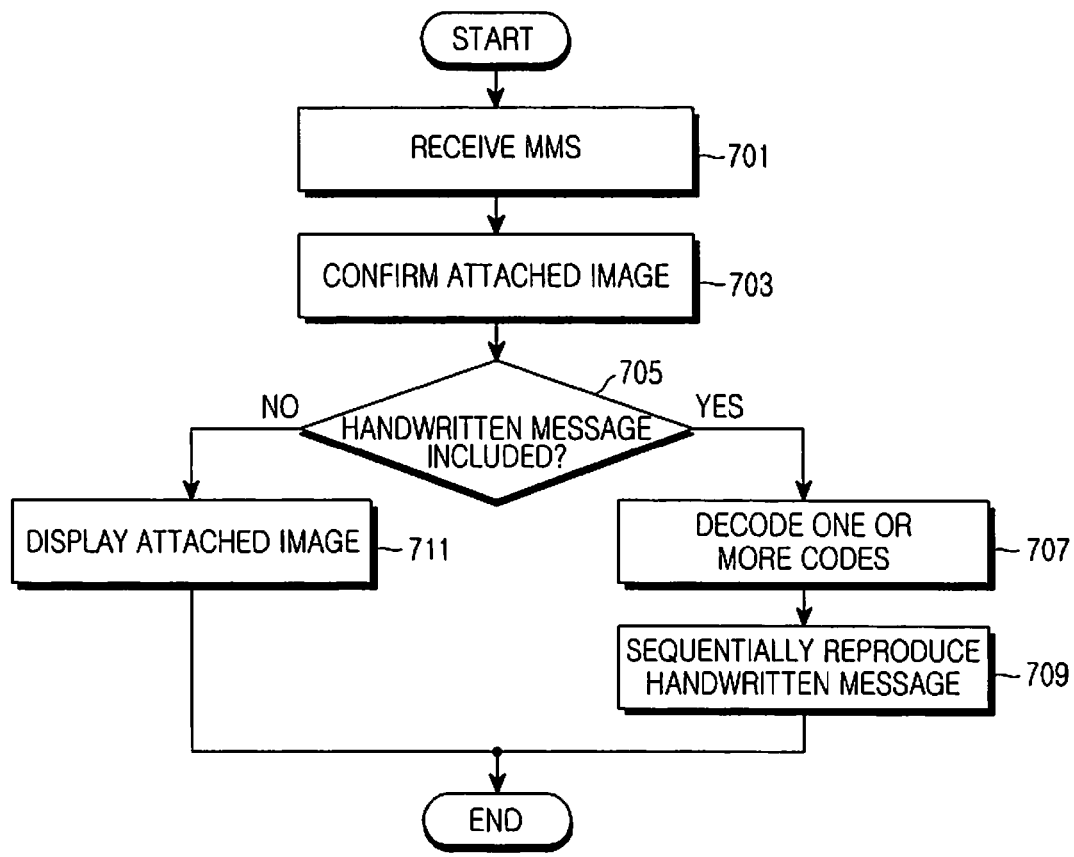
FIG. 7 is a flow chart illustrating a process of receiving an image including a handwritten message according to an embodiment of the present invention.

FIG. 7 is a flow chart illustrating a process of receiving an image including a handwritten message according to an embodiment of the present invention.

Referring to FIG. 7, a mobile terminal receives an MMS from another mobile terminal in step 701. The mobile terminal confirms whether the received MMS includes an attached image in step 703. If the MMS includes an attached image, the mobile terminal confirms whether the attached image is a general image or an image including a handwritten message in step 705. If the attached image is a general image, the mobile terminal displays the attached image on an output screen of the mobile terminal in step 711. The attached image may be output through an application such as an MMS viewer. Meanwhile, if the attached image is an image including a handwritten message having sequential time information, the mobile terminal decodes one or more codes recorded on an edge of an image screen in step 707. The mobile terminal reproduces the handwritten message on the output screen according to the sequential time information by using the decoded information in step 709.

In the present invention, one or more codes are recorded in an edge of an image screen in a clockwise direction from the left upper side of an image including handwritten information. Further, in order to reduce the occurrence of an error due to losses caused by a compression technique such as JPEG, information of one bit is designated by the same color on 2×2 pixels. However, these settings may vary in consideration of loss environments, user's preference, etc. An encoding process is displayed in real time on the screen of a mobile terminal and therefore a user can confirm the compressed capacity of handwritten data in real time.

According to embodiments of the present invention, time information and location information of one or more points constituting a handwritten message is included in one image and is transmitted. Therefore, it is possible to transmit an image including a handwritten message, which can express user's emotion without changing an existing MMS system.

Although embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A method for transmitting a handwritten message, the method comprising:
receiving the handwritten message that is input by a user on a touch screen in a sequential order;
generating a code image including point coordinates and time information of the sequential order of the handwritten message, wherein the code image includes a frame displayed around the handwritten message;
converting the handwritten message and the code image into a converted image; and
transmitting the converted image.

2. The method of claim 1, wherein generating the code image comprises:
dividing the handwritten message in units of lines;
applying the divided one or more lines to one or more events; and
generating the code image including the time information by encoding information about the one or more events.

3. The method of claim 2, wherein applying the divided one or more lines to the one or more events comprises:
dividing points including the one or more lines into a start point, an end point, and other points;
applying the start point, the end point, and the other points to different events; and
acquiring information about an event of each of the points including the one or more lines.

4. The method of claim 3, wherein the points including the one or more lines have unique time values corresponding to the time information and unique coordinate values corresponding to location information.

5. The method of claim 2, wherein portions of the code image are generated by encoding the information about the one or more events whenever the information about the events is generated, and
wherein the portions of the generated code image and the handwritten message are displayed in real time.

6. The method of claim 1, wherein converting the handwritten message and the code image into the converted image comprises:
recording the code image on an edge of the touch screen on which the handwritten message is displayed;
converting the recorded code image and the handwritten message into the converted image.

7. The method of claim 1, wherein the code image further comprises location information of the handwritten message.

8. The method of claim 1, wherein generating the code image comprises generating a portion of the code image for each stroke of the handwritten message, and
wherein each portion of the code image is displayed after each stroke of the handwritten message is written.

9. The method of claim 8, wherein each portion of the code image is sequentially displayed to form the frame around the handwritten message.

10. The method of claim 9, wherein a random image code is displayed to complete the frame around the handwritten message, when the displayed portions of the code image do not complete the frame and the handwritten message is complete.

11. An apparatus for transmitting a handwritten message, the apparatus comprising:
an input/output unit configured to receive the handwritten message that is input by a user in a sequential order;
a control unit configured to generate a code image including point coordinates and time information of the sequential order of the handwritten message, wherein the code image includes a frame displayed around the handwritten message, and to convert the handwritten message and the code image into a converted image; and
a radio communication unit configured to transmit the converted image.

12. The apparatus of claim 11, wherein the input/output unit comprises:
a touch screen display unit configured to receive the handwritten message input by the user and to display the code image with the handwritten message.

13. The apparatus of claim 11, wherein the control unit comprises:
a touch screen event processor configured to interpret the handwritten message according to one or more events and to transmit information about the one or more events and the handwritten message;
an encoder configured to generate the code image by encoding the information about the one or more events received from the touch screen event processor; and
an image processor configured to convert the handwritten message received from the touch screen event processor and the code image from the encoder into the converted image.

14. The apparatus of claim 13, wherein portions of the code image are generated by encoding the information about the events, whenever the information about the events is generated, and the portions of the generated code image and the handwritten message are generated in real time.

15. The apparatus of claim 13, wherein the encoder is configured to divide the handwritten message in units of lines, apply the divided one or more lines to one or more events, encode information about the one or more events, and generate the code image including the time information.

16. The apparatus of claim 11, wherein the radio communication unit includes:
a Multimedia Message Service (MMS) transmitter configured to transmit the converted image to another mobile terminal.

17. The apparatus of claim 8, wherein the code image further comprises location information of the handwritten message.

18. The apparatus of claim 11, wherein the control unit is configured to generate a portion of the code image for each stroke of the handwritten message, and to display each portion of the code image after each stroke of the handwritten message is written.

19. The apparatus of claim 18, wherein the control unit is configured to sequentially display each portion of the code image to form the frame around the handwritten message.

20. The apparatus of claim 19, wherein the control unit is configured to display a random image code to complete the frame around the handwritten message, when the displayed portions of the code image do not complete the frame and the handwritten message is complete.

21. A method for receiving a handwritten message, the method comprising:
receiving, via a radio communication unit, a converted image including a handwritten message and a code image, wherein the code image includes point coordinates and time information of a sequential input order of the handwritten message, and includes a frame displayed around the handwritten message; and
sequentially reproducing the handwritten message according to the time information included in the code image.

22. An apparatus for receiving a handwritten message, the apparatus comprising:
a radio communication unit configured to receive a converted image including a handwritten message and a code image, wherein the code image includes point coordinates and time information of a sequential input order of the handwritten message, and includes a frame displayed around the handwritten message;
an input/output unit configured to output the handwritten message; and
a control unit configured to sequentially reproduce the handwritten message on the input/output unit according to the time information included in the code image.

23. The apparatus of claim 22, wherein the control unit comprises:
a decoder configured to decode the code image including the time information; and
a handwritten message processor configured to sequentially reproduce the handwritten message using the decoded code information received from the decoder.

24. The apparatus of claim 22, wherein the radio communication unit comprises a Multimedia Message Service (MMS) configured to receive the converted image from another mobile terminal.

* * * * *